United States Patent
Chen et al.

(10) Patent No.: US 8,199,499 B2
(45) Date of Patent: Jun. 12, 2012

(54) COMPUTER ENCLOSURE WITH POWER SUPPLY

(75) Inventors: Yun-Lung Chen, Taipei Hsien (TW); Bang-Chun Ding, Shenzhen (CN); Bao Shen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 304 days.

(21) Appl. No.: 12/506,706

(22) Filed: Jul. 21, 2009

(65) Prior Publication Data

US 2010/0124015 A1     May 20, 2010

(30) Foreign Application Priority Data

Nov. 17, 2008 (CN) ...................... 2008 2 0302806 U

(51) Int. Cl.
*H05K 5/00* (2006.01)

(52) U.S. Cl. ................ 361/679.6; 361/679.58; 361/724; 361/726; 312/223.1; 312/223.2

(58) Field of Classification Search ............. 361/679.58, 361/610
See application file for complete search history.

(56) References Cited

U.S. PATENT DOCUMENTS

| | | | | |
|---|---|---|---|---|
| 5,777,848 A * | 7/1998 | McAnally et al. | ............ | 361/725 |
| 7,088,587 B2 * | 8/2006 | Chen et al. | ..................... | 361/724 |
| 7,140,801 B2 * | 11/2006 | Greenside et al. | ......... | 403/322.4 |
| 7,327,567 B2 * | 2/2008 | Chen et al. | ............... | 361/679.41 |
| 7,453,698 B2 * | 11/2008 | Cox et al. | ...................... | 361/726 |
| 7,639,506 B2 * | 12/2009 | Chen et al. | ..................... | 361/747 |
| 2003/0043549 A1 * | 3/2003 | Chen et al. | ..................... | 361/724 |
| 2003/0193782 A1 * | 10/2003 | Chen | ............................. | 361/726 |
| 2004/0223298 A1 * | 11/2004 | Chen et al. | ..................... | 361/683 |
| 2005/0152107 A1 * | 7/2005 | Chen et al. | ..................... | 361/683 |

* cited by examiner

*Primary Examiner* — Anthony Q Edwards
(74) *Attorney, Agent, or Firm* — Altis Law Group, Inc.

(57) ABSTRACT

A computer enclosure includes a chassis configured for securing a power supply therein. The chassis includes a bottom plate and a rear plate generally perpendicular to the bottom plate. A positioning structure is formed on the rear plate and configured for blocking the power supply from moving on the rear plate. A resiliently deformable latch piece is located on the bottom plate. A blocking portion is located on the latch piece configured for engaging with the power supply to block the power supply from moving in a direction perpendicular to the rear plate. The latch piece is resiliently deformable for disengaging the blocking portion from the power supply.

3 Claims, 6 Drawing Sheets

COMPUTER ENCLOSURE WITH POWER SUPPLY

BACKGROUND

1. Technical Field

The present disclosure relates to computer enclosures, and particularly to a computer enclosure for securing a power supply therein.

2. Description of Related Art

A power supply is usually needed in a personal computer system. Conventionally, a plurality of screws is often provided to secure the power supply in a chassis of the computer system. However, a screwdriver is needed and the screws are usually small. Therefore, it is very inconvenient to install the power supply with the screws in the chassis.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
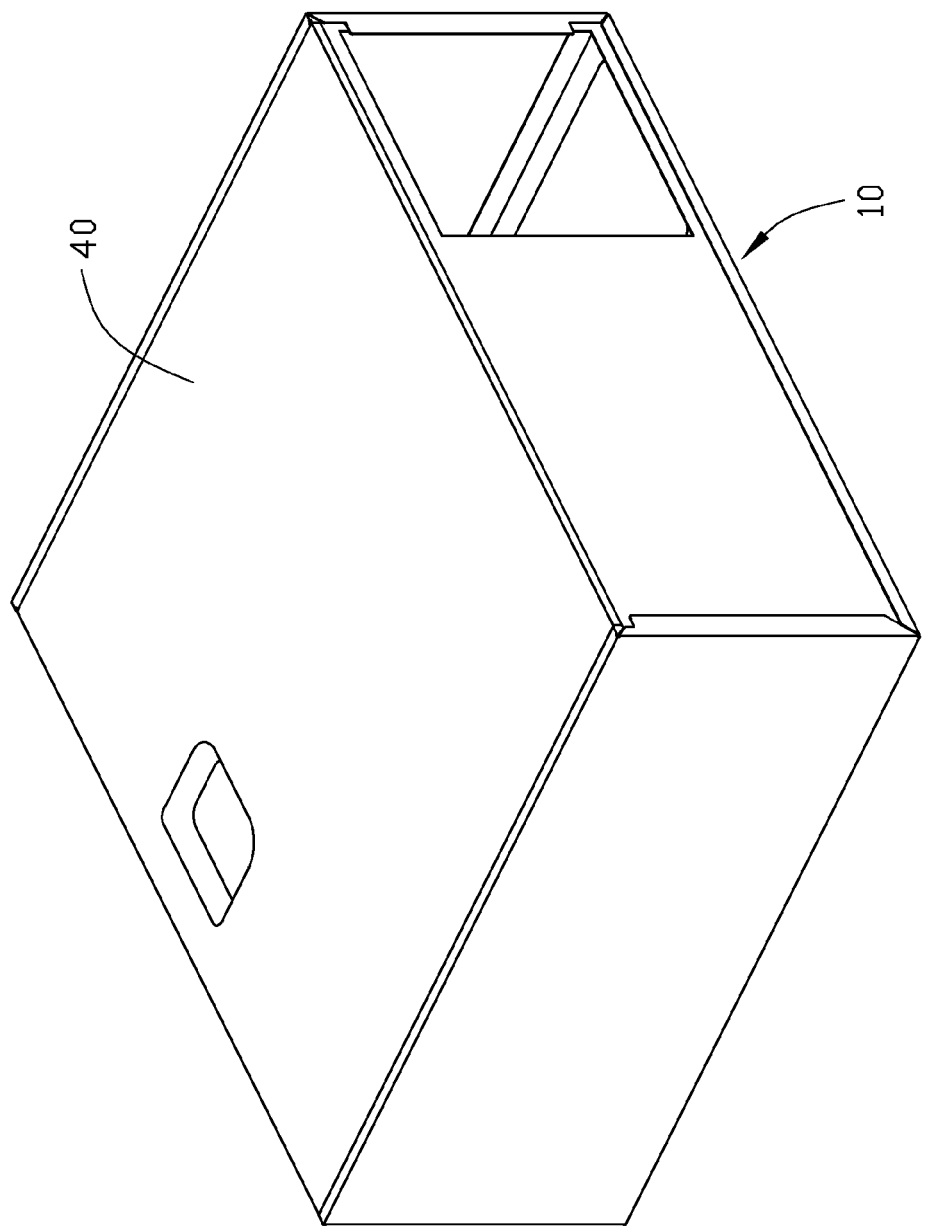
FIG. 1 is an assembled view of an embodiment of a computer enclosure, the computer system including a chassis and a cover.
Figure 3:
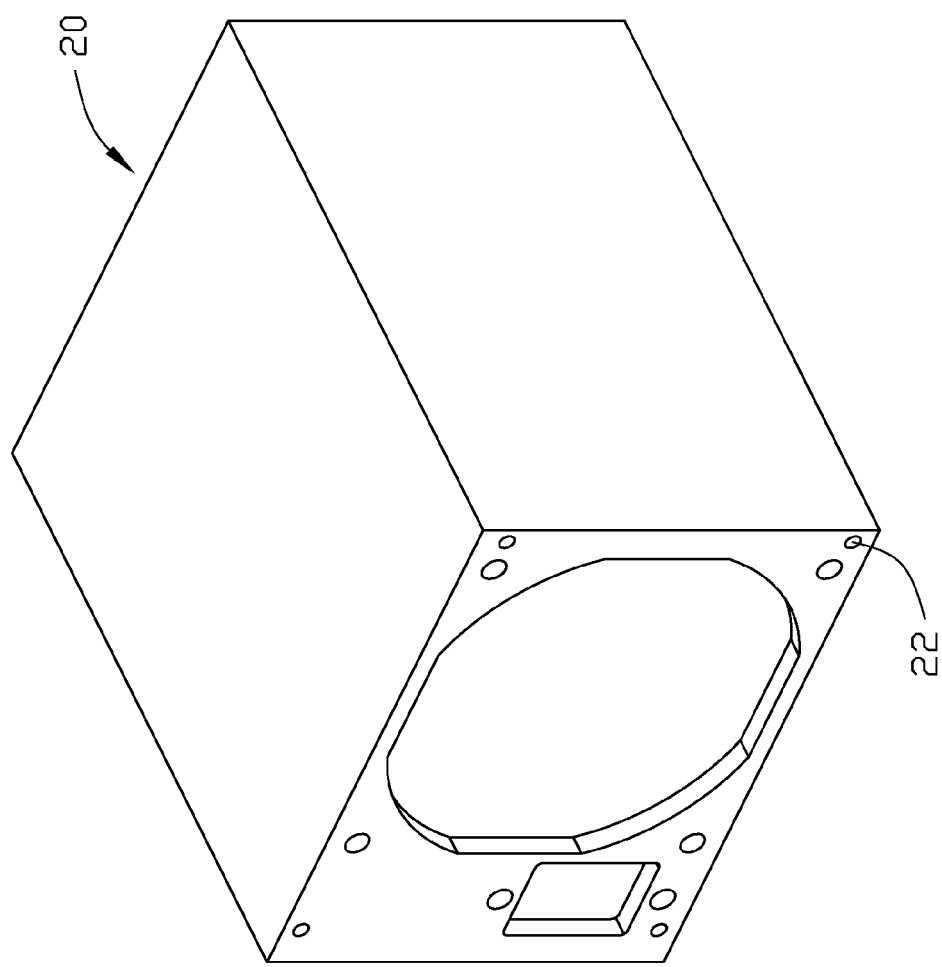
FIG. 3 is an isometric view of a power supply.

Referring to FIGS. 1 and 3, an embodiment of a computer enclosure includes a chassis 10 configured for securing a power supply 20 therein, and a cover 40 configured to be removably secured on the chassis 10. The power supply 20 is generally rectangular, and defines four positioning holes 22 in a side wall thereof.

Figure 2:
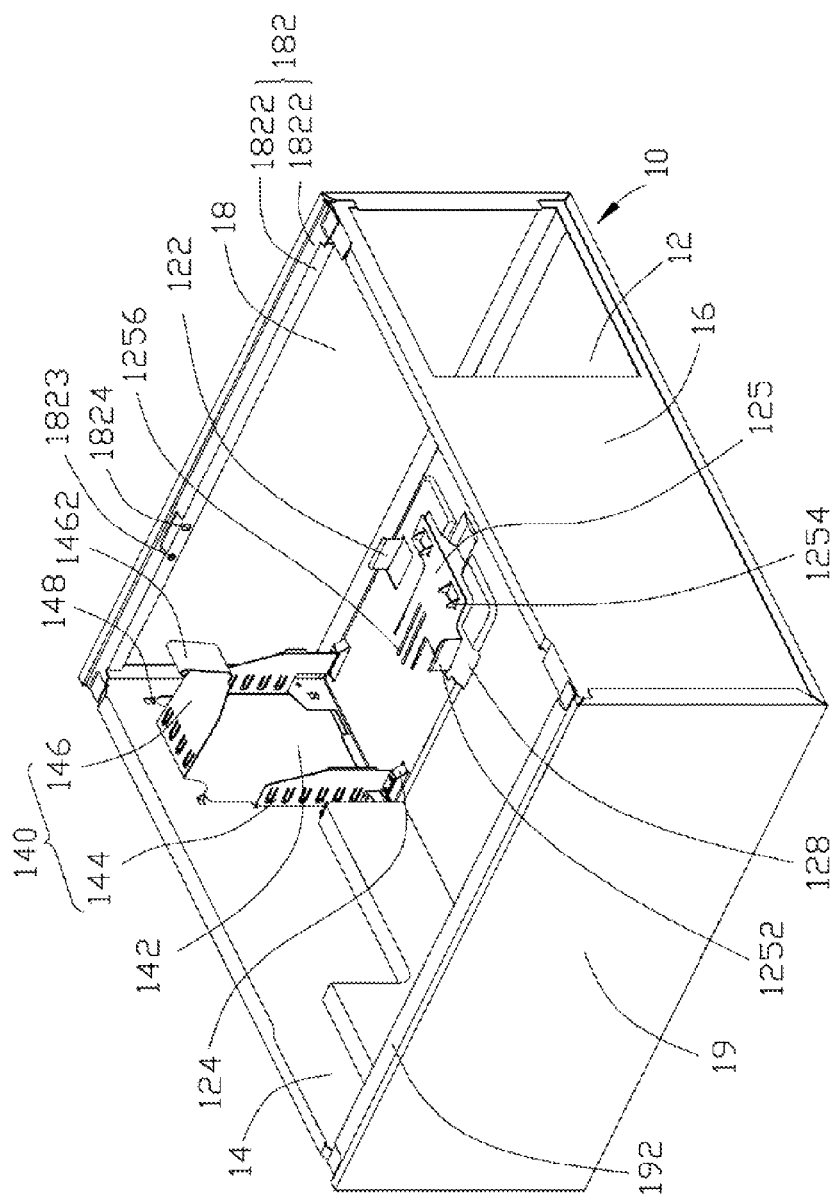
FIG. 2 is an isometric view of the chassis of FIG. 1.

Referring also to FIG. 2, the chassis 10 includes a bottom plate 12, a rear plate 14 perpendicular to the bottom plate 12, a front plate 16 parallel to the rear plate 14, and two parallel side plates 18, 19 perpendicular to the rear plate 14. A positioning structure is formed on the bottom plate 12 for preventing the power supply 20 from moving on the bottom plate 12 along a direction parallel to the rear plate 14, and includes a positioning piece 122, and a stop piece 1252. The positioning piece 122 extends from the bottom plate 12 adjacent the side plate 18. Two bridge-shaped mounting pieces 124 are located on an inner surface of the bottom plate 12 adjacent the rear plate 14. A resiliently deformable latch piece 125 is bent in from the bottom plate 12 adjacent the positioning piece 122. The stop piece 1252 of the positioning structure is bent up from an edge of the latch piece 125 away from the positioning piece 122. A plurality of blocking portions 1254, such as tabs in the embodiment, is bent up from the latch piece 125 adjacent an edge adjacent the front plate 16. Two ribs 1256 protrude from an inner surface of the bottom plate 12 on a joint between the latch piece 125, so as to increase connecting strength between the latch piece 125 and the bottom plate 12 and to prevent damage to the joint thereof during the latch piece 125 being repeatedly resiliently deformed. A receiving opening 128 is defined between the latch piece 125 and the bottom plate 12, for receiving the latch piece 125 when it is resiliently deformed toward the bottom plate 12.

A generally rectangular through opening 142 is defined in the rear plate 14 adjacent the side plate 18. A positioning structure 140 is formed on the rear plate 14 for preventing the power supply 20 from moving on the rear plate 14 along directions parallel to the rear plate 14, and includes two locating pieces 144, a pressing piece 146, and four tabs 148. The resilient pressing piece 146 is bent in from a top edge of the through opening 142. An operating piece 1462 is generally perpendicularly bent up from a free end of the pressing piece 146. The two locating pieces 144 are generally perpendicularly bent in from two parallel side edges of the through opening 142, which are perpendicular to the top edge of the through opening 142. The locating pieces 144 are capable of being fixed on the mounting piece 124 of the bottom plate 12 by fasteners (not labeled), such as screws. The four tabs 148 are located on an inner surface of the rear plate 14 adjacent four corners of the through opening 142, corresponding to the positioning holes 22 of the power supply 20.

Each of the side plates 18, 19 forms a flange 182, 192 on a top edges thereof. The flange 182 of the side plate 18 includes a horizontal portion 1821 and a vertical portion 1822 perpendicular to the horizontal portion 1821. A securing hole 1823 is defined in the vertical portion 1822, and a protrusion 1824 is located on an outer surface of the vertical portion 1822.

Figure 5:
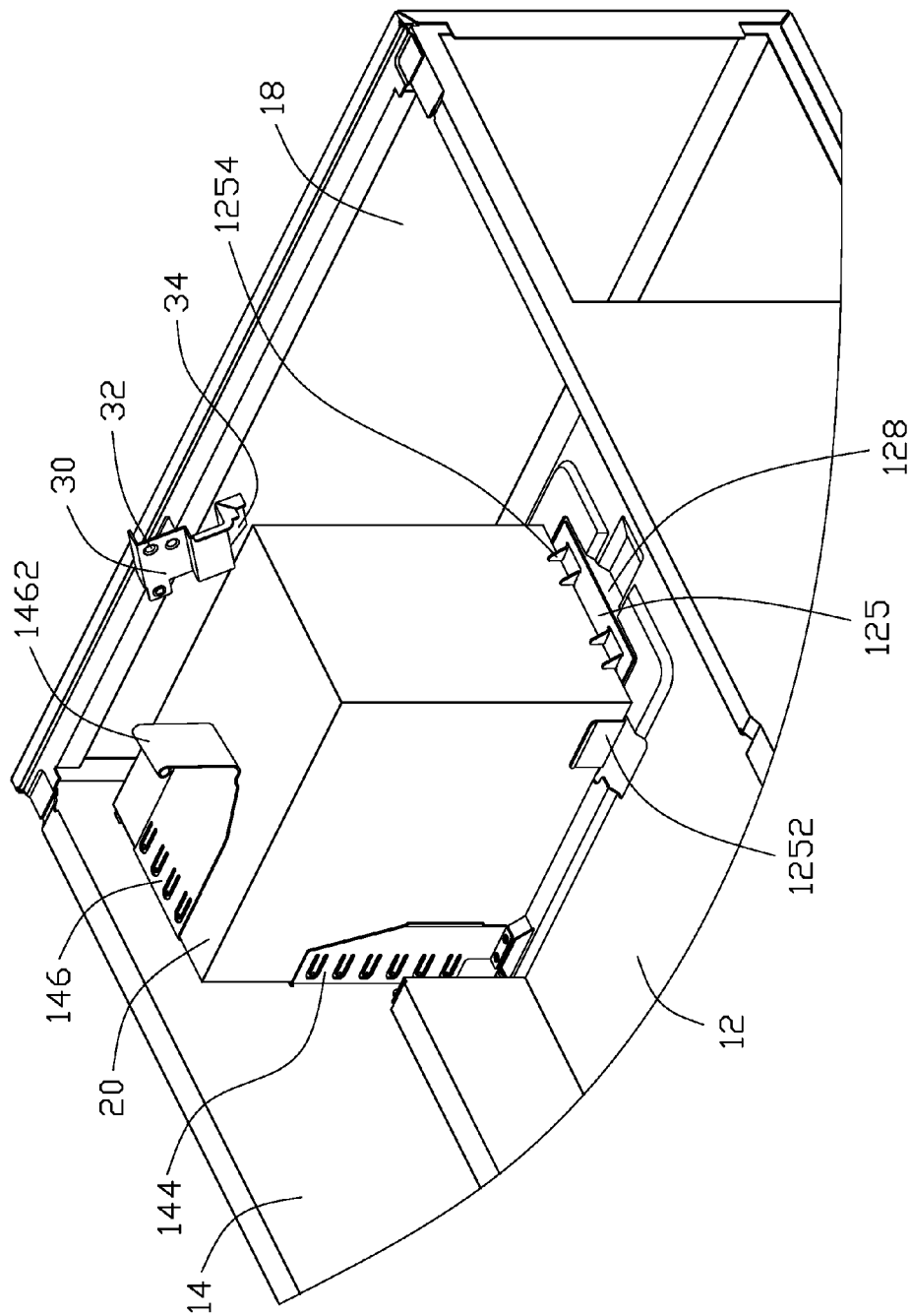
FIG. 5 is similar to FIG. 4, but showing a locking member secured on the chassis in a first position.
Figure 6:
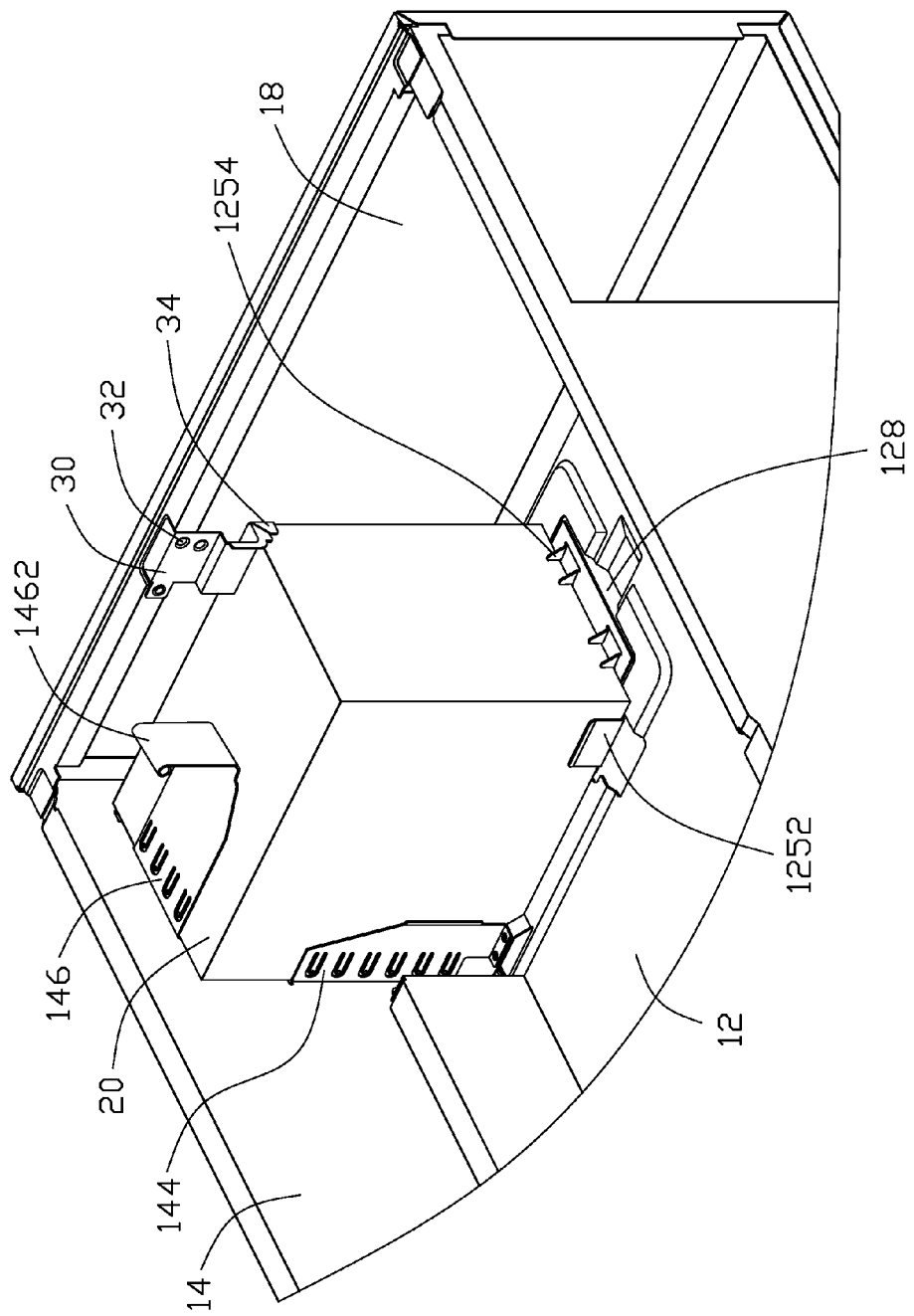
FIG. 6 is similar to FIG. 5, but showing the locking member rotated from the first position to a second position.

Referring also to FIGS. 5-6, a locking member 30 is capable of being fixed on the vertical portion 1822 of the flange 182 of the side plate 18. The locking member 30 defines a securing hole (not labeled) and two positioning holes 32 therein. Fasteners (not labeled), such as screws or rivets, are fixed in the securing hole of the locking member 30 and the securing hole 1823 of the side flange 182, so as to rotatably secure the locking member 30 on the flange 182 of the side plate 18. The locking member 30 is capable of rotating about an axis perpendicular to the side plate 18, and includes a positioning portion 34, which is capable of holding a corner of the power supply 20.

Figure 4:
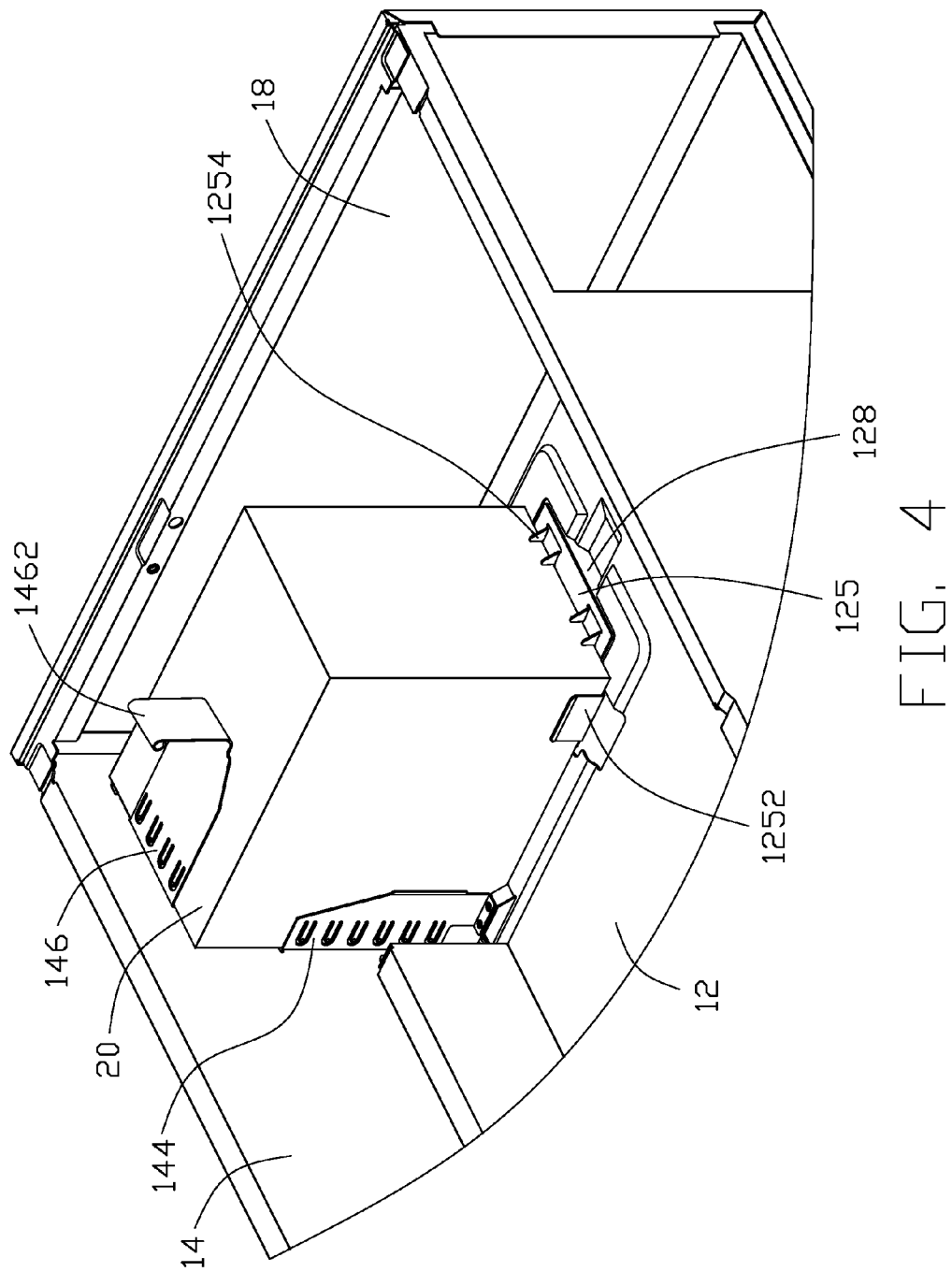
FIG. 4 is an assembled, cutaway view of the chassis of FIG. 2 and the power supply of FIG. 3.

Referring also to FIGS. 4-6, in assembly of the power supply 20, the locking member 30 is rotated up to a first position, in which the locking member 30 extends out of the chassis 10, and the protrusion 1824 of the side plate 18 is positioned in one of the positioning holes 32. The latch piece 125 is pressed to resiliently deform down in the receiving opening 128, so that the power supply 20 is capable of being pushed to slide in among the locating pieces 144 and the pressing piece 146. During sliding of the power supply 20, the power supply 20 resiliently deforms the pressing piece 146 up. When the tabs 148 of the rear plate 14 are inserted in the corresponding positioning holes 22 of the power supply 20 and the power supply 20 abuts on the rear plate 14, the latch piece 125 will rebound to abut against the power supply 20. The blocking portions 1254 abut against a rear wall of the power supply 20 and block the power supply 20 from sliding on the bottom plate 12. The positioning piece 122 and the stop piece 1252 sandwich the power supply 20 therebetween. The locking member 30 is rotated down from the first position to a second position, in which the protrusion 1824 of the side plate 18 is positioned in another positioning hole 32 of the locking member 30, and the positioning portion 34 abuts a corner of the power supply 20. Then the cover 40 is secured on the chassis 10, and presses the operating piece 1462 of the pressing piece 146 and abuts on the locking member 30, thereby more stably securing the power supply 20 in the chassis 10.

In disassembly of the power supply 20, the cover 40 is removed. The locking member 30 is rotated from the second position to the first position, so as to disengage from the corner of the power supply 20. The latch piece 125 is resiliently deformed down to disengage the blocking portions 1254 from the power supply 20, so that the power supply 20 can be pushed to slide out from among the locating piece 144 and the pressing piece 146 via the through opening 142 of the rear plate 14. Therefore, the power supply 20 is capable of being removed from the chassis 10.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer enclosure comprising:
   a chassis configured for securing a power supply therein, the chassis comprising a bottom plate and a rear plate generally perpendicular to the bottom plate, a positioning structure being formed on the rear plate and configured for blocking the power supply from moving on the rear plate;
   a resiliently deformable latch piece extending from the bottom plate, a blocking portion located on the latch piece and configured for engaging with the power supply to block the power supply from moving in a direction perpendicular to the rear plate, the latch piece being resiliently deformable for disengaging the blocking portion from the power supply; and
   a side plate generally perpendicular to the rear plate and the bottom plate, a locking member being rotatably secured on the side plate and capable of rotating from a first position, in which the locking member is capable of disengaging from the power supply, to a second position, in which the locking member is capable of engaging with the power supply.

2. The computer enclosure of claim 1, wherein the locking member is capable of rotating about an axis perpendicular to the side plate.

3. A computer enclosure comprising:
   a bottom plate being generally perpendicular to the rear plate;
   a pressing piece being located on the rear plate, and capable of blocking a power supply from moving on the rear plate along a direction perpendicular to the bottom plate;
   a positioning piece, extending from the bottom plate, and being capable of blocking the power supply from moving on the bottom plate in a direction parallel to the rear plate;
   a resiliently deformable latch piece being located on the bottom plate, a blocking portion located on the latch piece engaging with the power supply for blocking the power supply from moving on the bottom plate in a direction perpendicular to the rear plate, the latch piece being resiliently deformable for disengaging the blocking portion from the power supply; and
   a side plate generally perpendicular to the rear plate and the bottom plate, a locking member being secured on the side plate and rotatable about an axis perpendicular to the side plate from a first position, in which the locking member is capable of disengaging from the power supply, to a second position, in which the locking member is capable of engaging with the power supply.

* * * * *